US012560500B2

(12) United States Patent
Lopushansky et al.

(10) Patent No.: US 12,560,500 B2
(45) Date of Patent: Feb. 24, 2026

(54) EXTRINSIC FABRY-PEROT ABSOLUTE PRESSURE SENSOR

(71) Applicant: DAVIDSON INSTRUMENTS, INC., Conroe, TX (US)

(72) Inventors: Richard L. Lopushansky, The Woodlands, TX (US); John W. Berthold, Salem, OH (US)

(73) Assignee: DAVIDSON INSTRUMENTS, INC., Conroe, TX (US)

( * ) Notice: Subject to any disclaimer, the term of this patent is extended or adjusted under 35 U.S.C. 154(b) by 320 days.

(21) Appl. No.: 18/032,834

(22) PCT Filed: Oct. 20, 2021

(86) PCT No.: PCT/US2021/055765
§ 371 (c)(1),
(2) Date: Apr. 20, 2023

(87) PCT Pub. No.: WO2022/087078
PCT Pub. Date: Apr. 28, 2022

(65) Prior Publication Data
US 2023/0393005 A1     Dec. 7, 2023

Related U.S. Application Data

(60) Provisional application No. 63/094,063, filed on Oct. 20, 2020.

(51) Int. Cl.
*G01L 9/00* (2006.01)
*G01L 19/06* (2006.01)

(52) U.S. Cl.
CPC ........ *G01L 9/0079* (2013.01); *G01L 19/0627* (2013.01)

(58) Field of Classification Search
CPC ..... G01L 9/0079; G01L 1/242; G01L 11/025; G01L 1/246; G01L 11/02; G01L 19/04;
(Continued)

(56) References Cited

U.S. PATENT DOCUMENTS 4,572,669 A * 2/1986 James ................... G01K 11/12
374/E11.018
4,943,032 A 7/1990 Zdeblick
(Continued)

FOREIGN PATENT DOCUMENTS

CN       101858809 A * 10/2010
DE    102011077499 A1    12/2012
(Continued)

OTHER PUBLICATIONS

Extended European Search Report in EP21883774.8, mailed Dec. 2, 2024, 14 pages.
(Continued)

*Primary Examiner* — Michael P Stafira

(74) *Attorney, Agent, or Firm* — McDonald Hopkins LLC

(57) ABSTRACT

A temperature-tolerant, shock and vibration resistant absolute pressure sensor may be constructed by joining a ruggedized lens assembly and optical fiber assembly to create a stable beam of collimated light. The lens may be captured by brazing or welding to high-strength spherical metal components. The light delivery assembly may be comprised of a metal jacketed optical fiber, ceramic ferrule, and metal alignment sleeves that are mechanically and/or chemically joined to one another using high temperature sealing glass preforms or brazing materials. The optical fiber assembly may be joined to the lens assembly securing the end face of the optical fiber in the operative focal position relative to the lens. The joined assembly results in a structure where no
(Continued)

Extrinsic Fabry-Perot Sensor Subassembly 120    Window Assembly 40
Alignment Socket 30
Lens Assembly 20
Light Delivery Assembly 110
Pressure Diaphragm Assembly 60
Collimated Beam 150
Fabry Perot Interferometer 70

Extrinsic Fabry-Perot Pressure Sensor Assembly 160

Hermetically-Sealed
Alignment Socket
Window Assembly
130 parts are subject to movement even at extreme temperatures or when subjected to severe shock and vibration. All the air-to-glass interfaces may have anti-reflection coatings to reduce optical losses, back reflection, and false signals. This rugged collimated beam assembly may be joined to a sensor assembly comprised of a diaphragm and window which comprise a Fabry-Perot interferometer. The external wetted surfaces of the diaphragm may be coated to reflect the radiant energy or with passive conductive and convective arrangements to keep the sensor cool and to minimize the long-term change in sensitivity of the diaphragm due to oxidation. The resulting sensors can be further enhanced by attaching the sensor to an absolute, hermetically sealed connector comprised of a lens assembly which is aligned and welded to the sensor transducer body. The resulting sensors can be further enhanced with windows for collecting UV energy and may use wide spectral band optical fibers to multiplex UV, visible, and IR energy from the sensing environment. These enhancements can be used to detect the presence of a flame and to make temperature measurements resulting in safety-certified optical sensors for use in many harsh industrial applications.

29 Claims, 7 Drawing Sheets

(58) Field of Classification Search
CPC . G01L 9/0073; G01L 19/0092; G01L 9/0075; G01L 1/24; G01L 9/125; G01L 9/0042; G01L 9/0072; G01L 19/0636; G01L 9/0047; G01L 13/025; G01L 15/00; G01L 9/00; G01L 5/166; G01L 9/0007; G01L 9/0077; G01L 27/007; G01L 1/247; G01L 1/26; G01L 5/0085; G01L 5/045; G01L 13/00; G01L 19/0046; G01L 21/12; G01L 9/0076; G01L 1/241; G01L 19/0627; G01L 19/12; G01L 13/023; G01L 19/00; G01L 27/002; G01L 5/0009; G01L 11/04; G01L 17/00; G01L 9/0092; G01L 7/086; G01L 7/065; G01L 7/08; G01L 23/16; G01L 5/101; G01L 9/0032; G01L 1/00; G01L 1/245; G01L 5/0004; G01L 5/0019; G01L 1/243; G01L 5/00; G01L 5/226; G01L 9/0052; G01L 9/06; G01L 11/00; G01L 19/0618; G01L 3/12; G01L 3/1421; G01L 5/24; G01L 9/0008; G01L 9/0011; G01L 9/0017; G01L 9/002; G01L 9/0045; G01L 9/0058; G01L 9/007; G01L 19/14; G01L 5/105; G01L 5/16; G01L 7/045; G01L 1/2281; G01L 19/0007; G01L 19/06; G01L 19/0672; G01L 19/0681; G01L 23/06; G01L 25/00; G01L 27/005; G01L 5/223; G01L 7/187; G01L 9/0044; G01L 9/0048; G01L 9/008; G01L 9/0088; G01L 9/0089; G01L 1/005; G01L 1/04; G01L 1/103; G01L 1/142; G01L 19/141; G01L 5/0028; G01L 5/0047; G01L 5/0052; G01L 5/0057; G01L 5/133
See application file for complete search history.

(56) References Cited

U.S. PATENT DOCUMENTS

| | | | |
|---|---|---|---|
| 7,782,465 B2 | 8/2010 | Gibler et al. | |
| 8,432,552 B2 | 4/2013 | Gibler et al. | |
| 2005/0244096 A1* | 11/2005 | Jeffers | G01B 9/02027 |
| | | | 385/15 |
| 2011/0170112 A1* | 7/2011 | Gibler | G01J 3/26 |
| | | | 356/480 |
| 2014/0293286 A1 | 10/2014 | Kapit et al. | |
| 2015/0285699 A1 | 10/2015 | Brinciotti et al. | |

FOREIGN PATENT DOCUMENTS

| | | | | | |
|---|---|---|---|---|---|
| DE | 102020210886 A1 | * | 4/2021 | | G03F 7/7085 |
| EP | 3353517 B1 | * | 3/2020 | | G01L 13/023 |
| WO | WO-2012090210 A1 | * | 7/2012 | | G01D 5/268 |
| WO | WO-2020031091 A1 | * | 2/2020 | | A61B 18/1815 |

OTHER PUBLICATIONS

Patent Cooperation Treaty (PCT), International Search Report and Written Opinion for Application PCT/US2021/055765 filed Oct. 20, 2021, mailed Jan. 14, 2022 International Searching Authority, US.

* cited by examiner

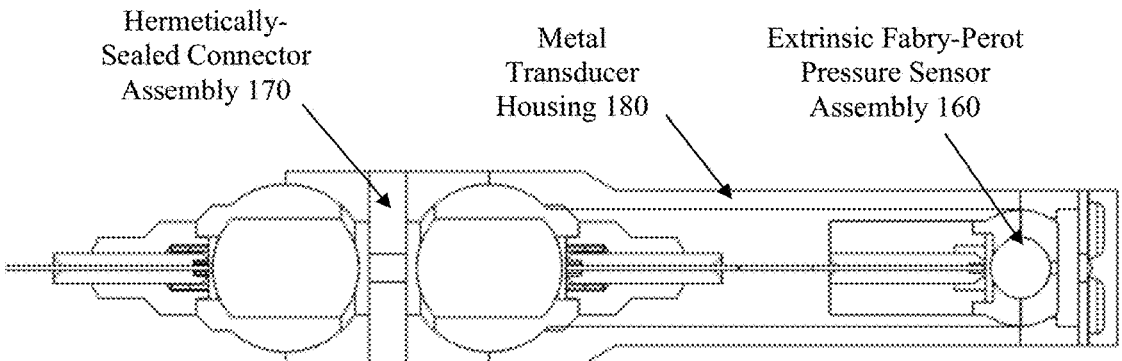

Hermetically-
Sealed Connector
Assembly 170

Metal
Transducer
Housing 180

Extrinsic Fabry-Perot
Pressure Sensor
Assembly 160

**Figure 1 – General Configuration of Extrinsic Fabry-Perot Absolute Pressure
Transducer Assembly 190**

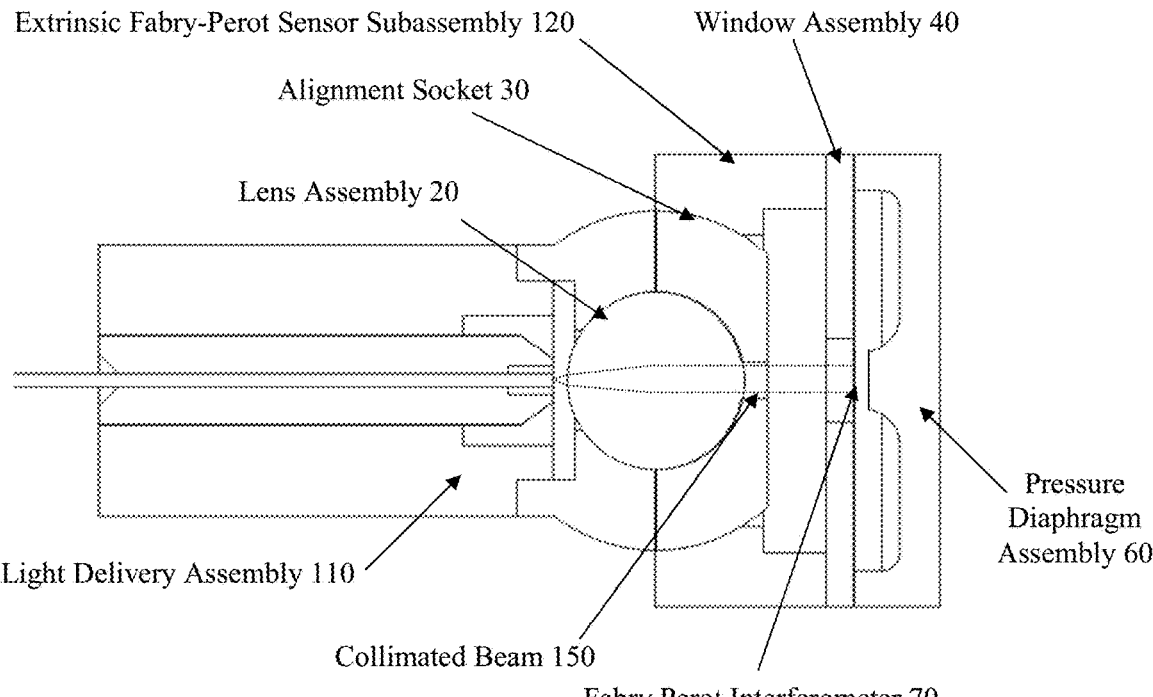

Extrinsic Fabry-Perot Sensor Subassembly 120

Window Assembly 40

Alignment Socket 30

Lens Assembly 20

Light Delivery Assembly 110

Collimated Beam 150

Fabry Perot Interferometer 70

Pressure
Diaphragm
Assembly 60

Figure 2 – Extrinsic Fabry-Perot Pressure Sensor Assembly 160

Hermetically-Sealed
Alignment Socket
Window Assembly
130

Light Delivery
Assembly 110
Light Delivery
Assembly 110
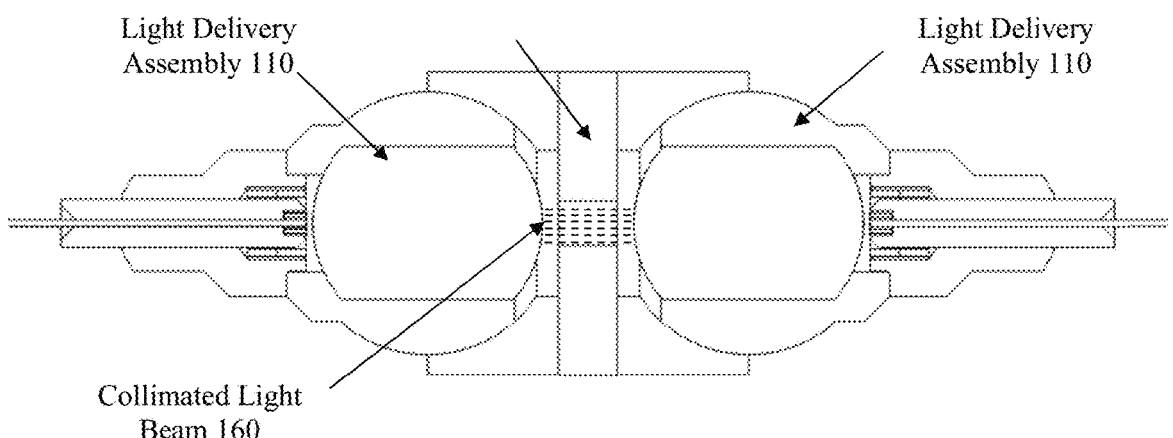
Collimated Light
Beam 160
Figure 3 – Hermetically-Sealed Connector Assembly 170
Optical Fiber
Assembly 10
Lap First Surface of
Lens Assembly to
Optimize Focus 34
Lens Assembly
20
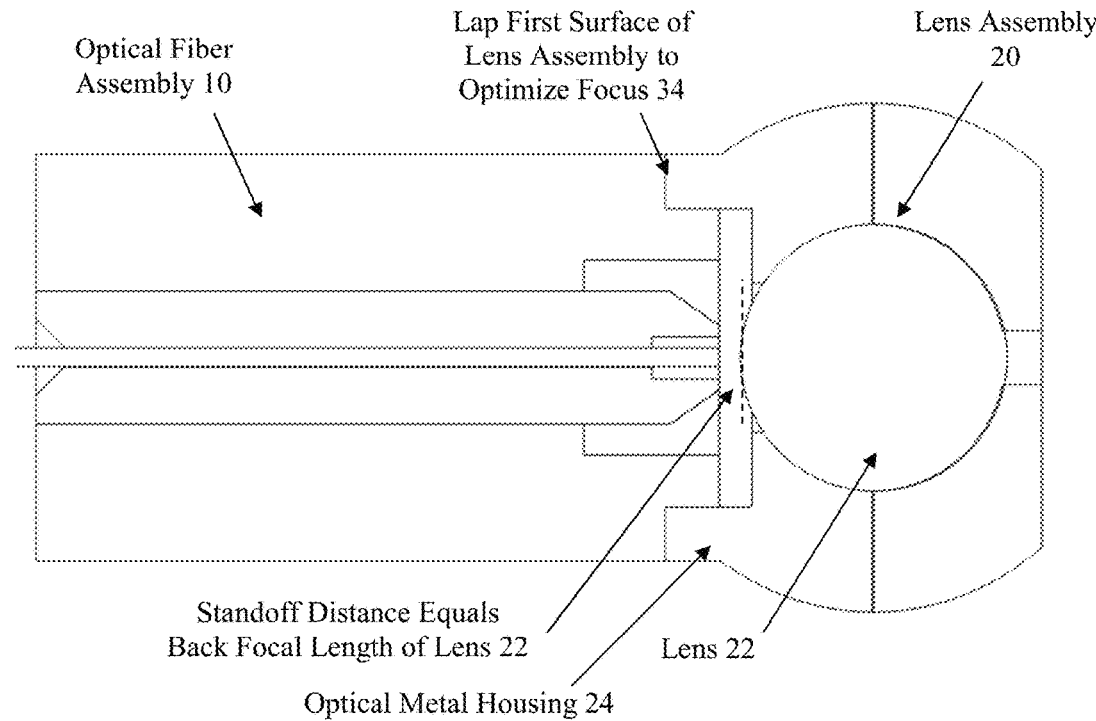
Standoff Distance Equals
Back Focal Length of Lens 22
Lens 22
Optical Metal Housing 24
Figure 4 – Light Delivery Assembly 110
Metal Housing
16
Sealing
Glass
18

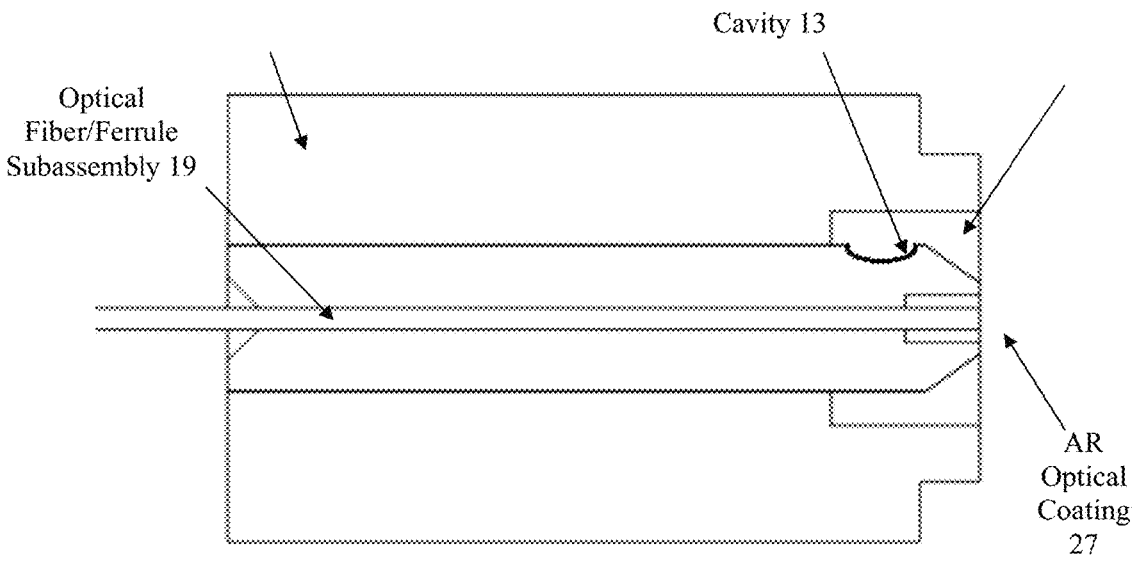
Cavity 13
Optical
Fiber/Ferrule
Subassembly 19
AR
Optical
Coating
27
Figure 5 – Optical Fiber Assembly 10
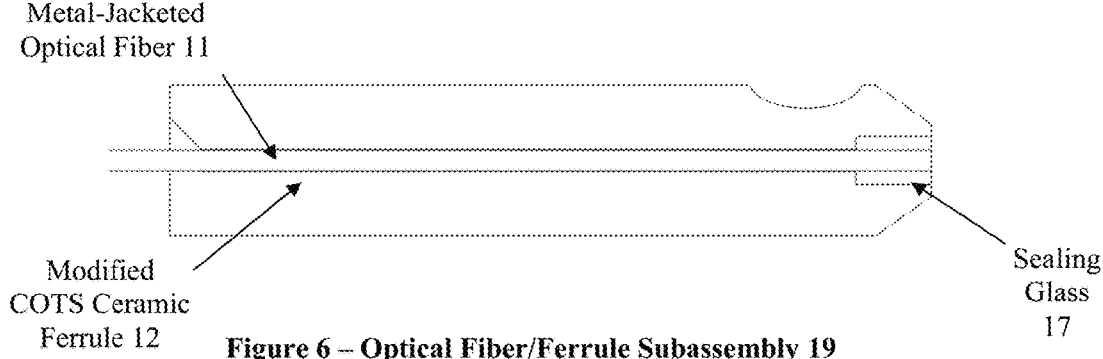
Metal-Jacketed
Optical Fiber 11
Modified
COTS Ceramic
Ferrule 12
Sealing
Glass
17
Figure 6 – Optical Fiber/Ferrule Subassembly 19
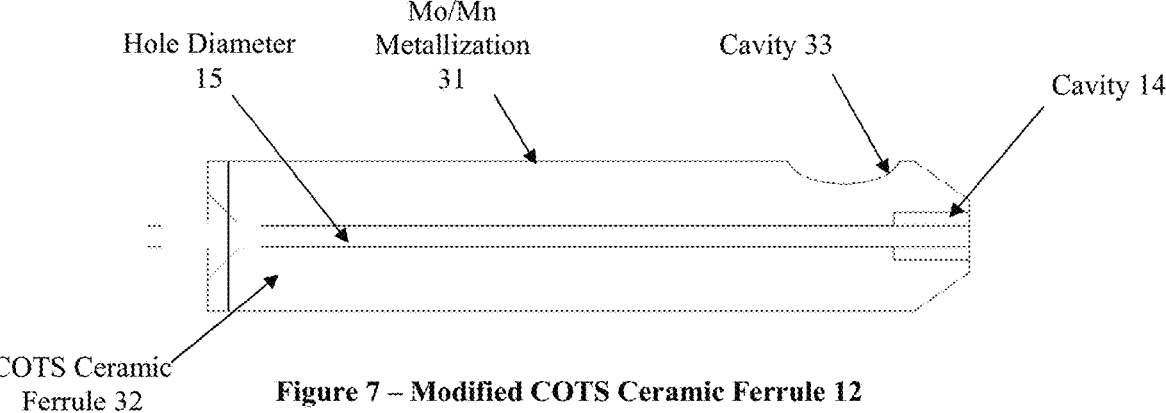
Hole Diameter
15
Mo/Mn
Metallization
31
Cavity 33
Cavity 14
COTS Ceramic
Ferrule 32
Figure 7 – Modified COTS Ceramic Ferrule 12

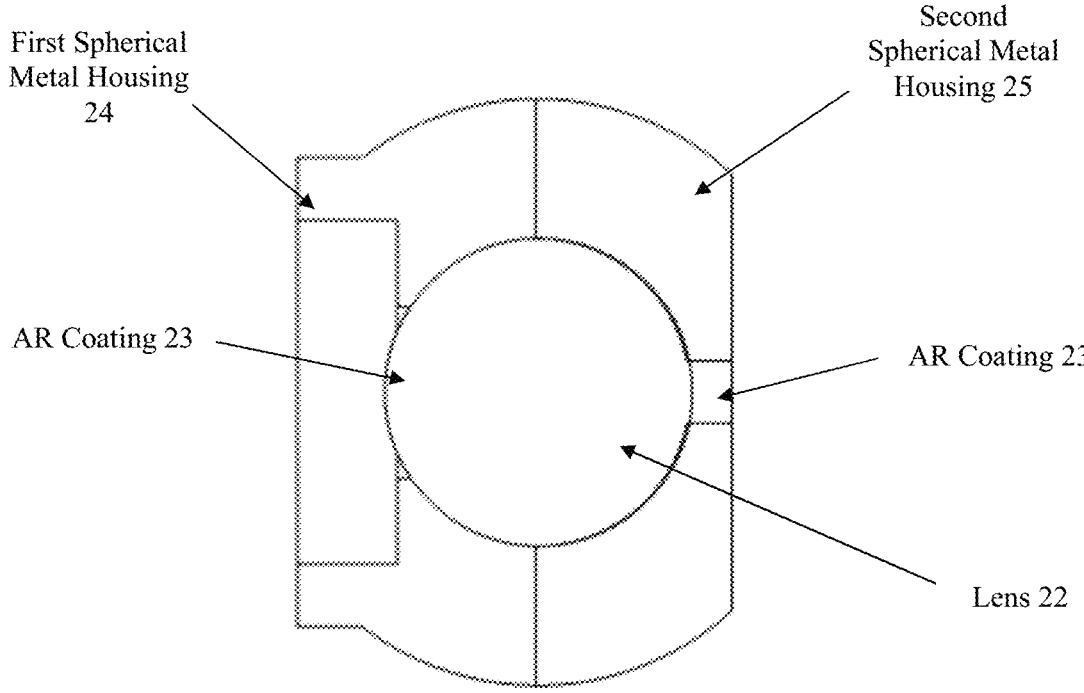
Figure 8 – Clamshell Lens Assembly 20
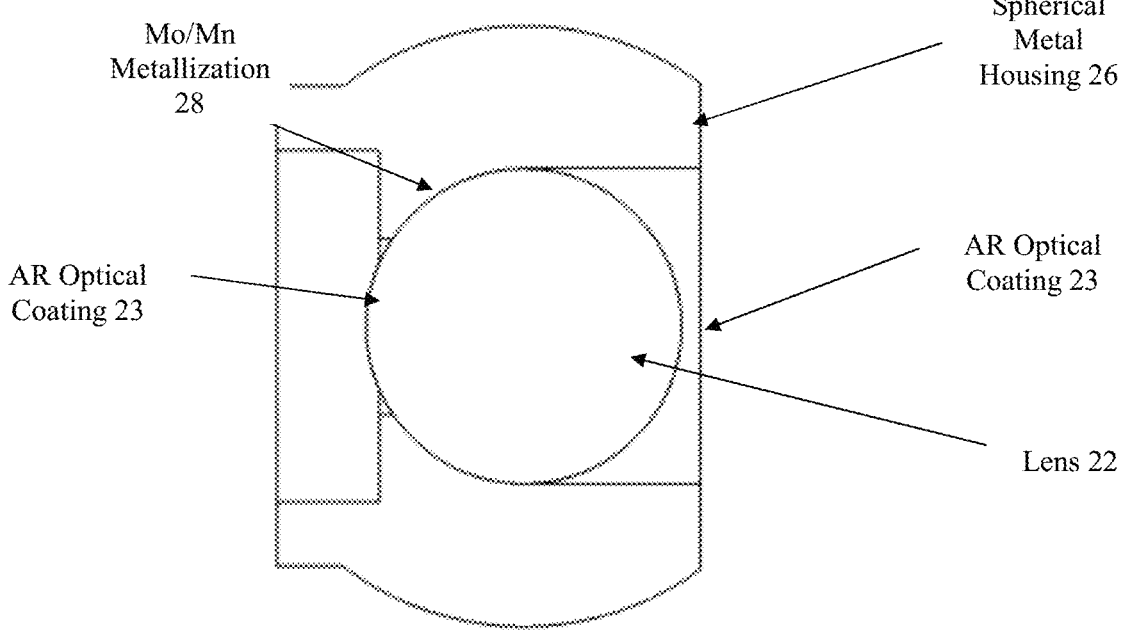
Figure 9 – Brazed Lens Assembly 21

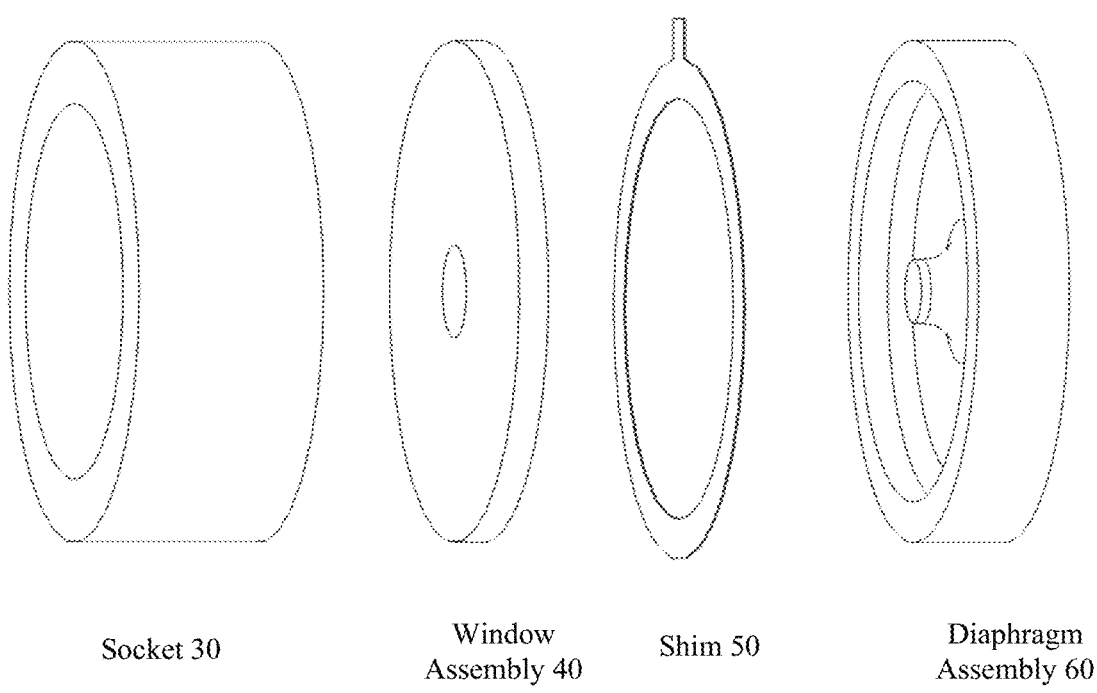
Socket 30          Window          Shim 50          Diaphragm
                   Assembly 40                      Assembly 60
Figure 10A – Fabry-Perot Sensor Subassembly, Exploded View 120
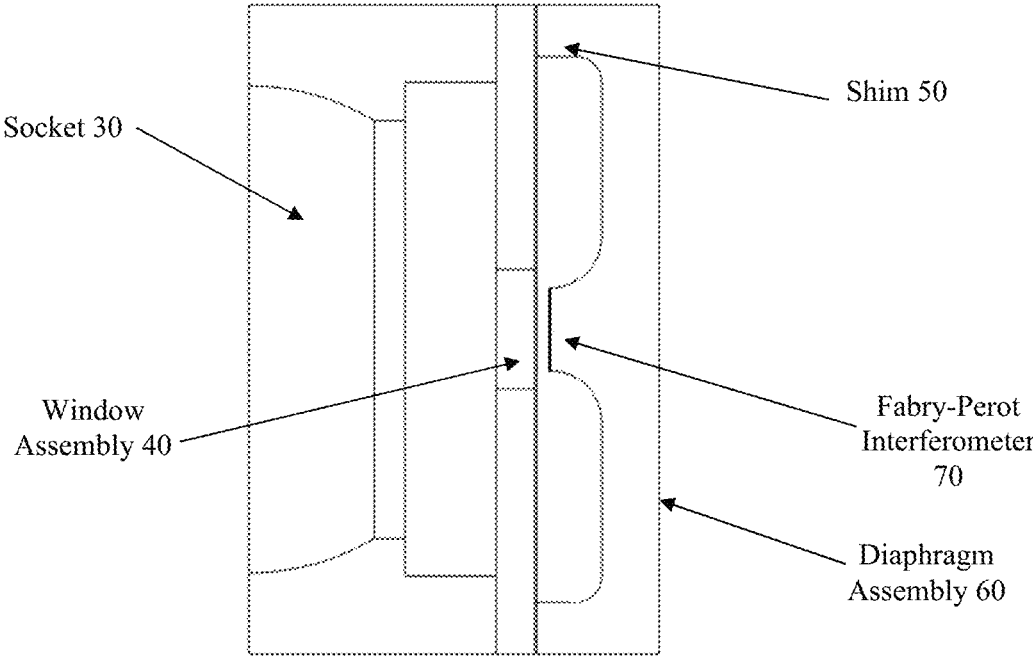
Shim 50
Socket 30
Window
Assembly 40
Fabry-Perot
Interferometer
70
Diaphragm
Assembly 60
Figure 10B – Fabry-Perot Sensor Subassembly 120

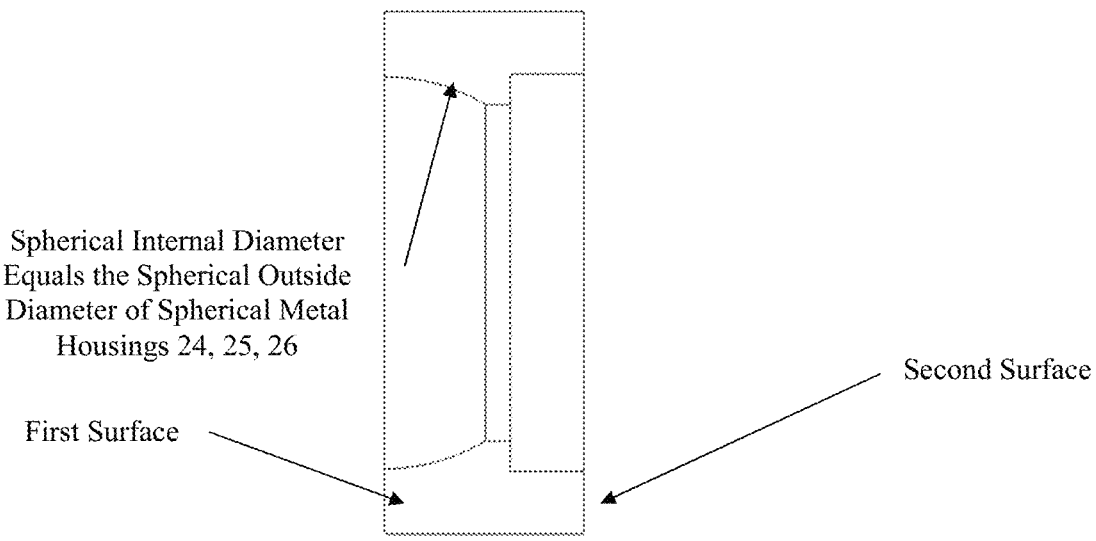
Spherical Internal Diameter
Equals the Spherical Outside
Diameter of Spherical Metal
Housings 24, 25, 26
First Surface
Second Surface
Figure 11 – Alignment Socket 30
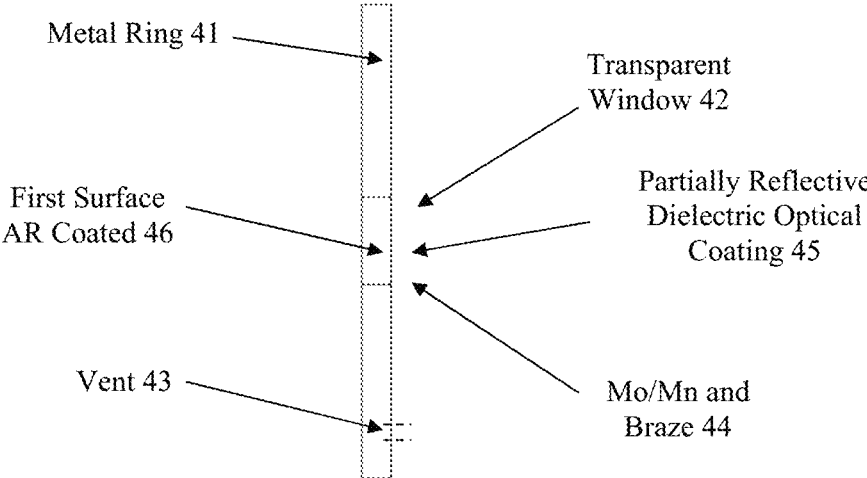
Metal Ring 41
Transparent
Window 42
Partially Reflective
Dielectric Optical
Coating 45
First Surface
AR Coated 46
Vent 43
Mo/Mn and
Braze 44
Figure 12 – Window Assembly 40

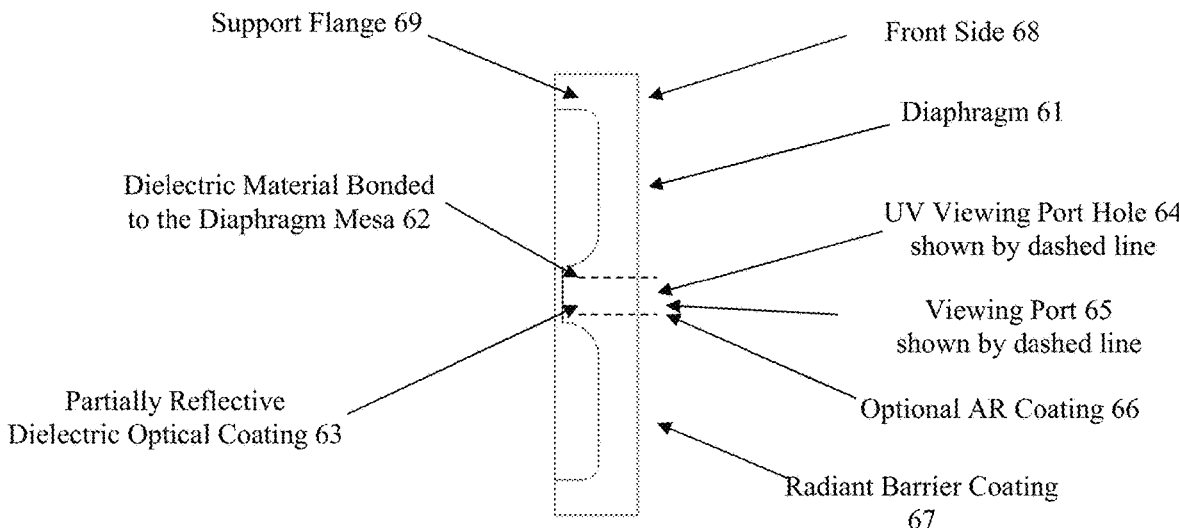

Support Flange 69

Front Side 68

Diaphragm 61

Dielectric Material Bonded
to the Diaphragm Mesa 62

UV Viewing Port Hole 64
shown by dashed line

Viewing Port 65
shown by dashed line

Partially Reflective
Dielectric Optical Coating 63

Optional AR Coating 66

Radiant Barrier Coating
67

Figure 13 – Diaphragm Assembly 60

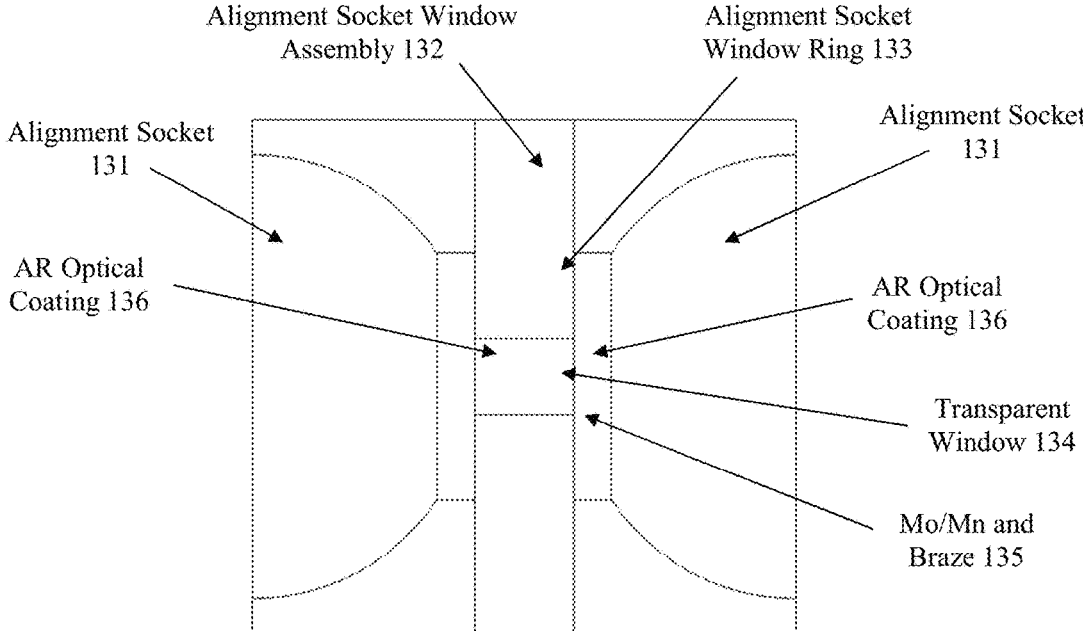

Alignment Socket Window
Assembly 132

Alignment Socket
Window Ring 133

Alignment Socket
131

Alignment Socket
131

AR Optical
Coating 136

AR Optical
Coating 136

Transparent
Window 134

Mo/Mn and
Braze 135

Figure 14 – Hermetically-Sealed Alignment Socket Window Assembly 130

EXTRINSIC FABRY-PEROT ABSOLUTE PRESSURE SENSOR

CROSS-REFERENCE TO RELATED APPLICATION

This application is a 35 U.S.C. § 371 national stage application of PCT Application No. PCT/US2021/055765 filed on Oct. 20, 2021 entitled "EXTRINSIC FABRY-PEROT ABSOLUTE PRESSURE SENSOR," which claims priority to U.S. Provisional Application No. 63/094,063 filed on Oct. 20, 2020, each of which is are hereby incorporated by reference in their entireties.

FIELD OF INVENTION

The present invention relates to Fabry-Perot pressure sensors and related optical components where a rugged, stable, temperature-tolerant, collimated light beam is used to make precise, high-speed, pressure measurements in harsh industrial applications.

BACKGROUND OF THE INVENTION

The use of Fabry-Perot interferometers to measure pressure is known. Ball lenses are commonly used in such interferometers to deliver a collimated beam of light to increase the optical energy density and the uniformity of the path length of the light rays acting on the interferometers. Interferometers using collimated beams of light have higher sampling rates and better signal quality when compared to interferometers using divergent beams of light even when low numerical aperture 0.12 radians, optical fibers are used. Ball lenses make similar improvements when used in fiber optic connectors making it possible to deliver higher optical energy density through an optical circuit. Higher energy density connectors become especially important when the sensor and transducer assembly needs to be hermetically sealed and make absolute pressure measurements.

Ball lenses which are formed as integral micro-lenses and cantilevered on the ends of optical fibers are not rugged enough to survive high shock environments. Ball lenses which use adhesives to hold the lens in position are limited to applications operating at low temperatures, i.e., less than 500° F. which is the practical upper limit for high temperature adhesives.

Producing extrinsic Fabry-Perot interferometric absolute static pressure sensors that can make precise and reliable measurements at temperatures over 1000° F. in severe shock and vibration environments is a significant technical challenge. Ball lens assemblies suitable for use in harsh industrial applications are not commercially available. Rugged, temperature-tolerant ball lens assemblies would be welcomed by industry for use in Fabry-Perot pressure sensors and for use as hermetically sealed connectors in many critical harsh industrial applications where high fidelity, absolute pressure measurements are required. Such pressure sensors are urgently needed worldwide to achieve lower emissions from combustion engines used for electrical power generation and for propulsion of commercial aircraft. Such pressure sensors could also be used in many other oil & gas, aerospace, defense, and plastic injection molding applications all of which routinely require precise, high fidelity, high speed measurements of pressure at temperatures exceeding 500° F.

SUMMARY OF THE INVENTION

The present application discloses an extrinsic Fabry-Perot pressure sensor and a hermetically sealed connector assembly which are joined to a transducer housing and together comprise an extrinsic Fabry-Perot absolute pressure transducer.

The extrinsic Fabry-Perot pressure sensor is comprised of an optical fiber assembly with an optical fiber having an optical axis, said optical fiber having an anti-reflective coating deposited on its end, a lens assembly having an optical axis and said lens assembly rigidly affixed to such optical fiber assembly positioning the lens a fixed distance from the end of the optical fiber to optimize the focus and transmission of a collimated beam of light, said lens having anti-reflective coatings on both surfaces of said lens, an alignment socket which allows said optical fiber assembly and said lens assembly to be aligned through at least two degrees of freedom and affixed to the first end of said alignment socket, a transparent window assembly which first surface is affixed to the second end of said alignment socket, said window assembly having an anti-reflection (AR) optical coating deposited on its first surface and having a partially reflective optical coating deposited on its second surface, which two surfaces are plane and parallel to one another, a shim spacer with an aperture; with first surface of said shim affixed to the second surface of said window assembly, and a pressure diaphragm assembly which first surface is affixed to the second surface of said shim; said pressure diaphragm assembly having a partially reflective optical coating deposited on the center of said pressure diaphragm assembly, and said pressure diaphragm assembly capable of deflecting when subjected to applied external pressure. An extrinsic Fabry-Perot interferometer is created by the second surface on said window assembly, the air space created by said shim, and the first surface on said diaphragm assembly. The air space between the two reflective surfaces comprises the Fabry-Perot interferometer cavity or gap which measured cavity or gap length is a function of the applied external pressure.

The optical circuit for said extrinsic Fabry-Perot pressure sensor is comprised of a continuous stream of light rays that enter the optical fiber from a broadband light source. The light rays are transmitted through said optical fiber to the end of said optical fiber where a divergent beam of light radiates from said optical fiber and is projected through the air space and onto a lens. The continuous divergent beam of light travels through said lens and radiates from said lens as a collimated beam of light. Said continuous collimated light beam is projected through the air space and onto a window where the light is refracted along a new path through said window and is refracted again upon exiting said window. Said continuous collimated beam of light then reflects multiple times between the two plane, parallel, and partially reflective surfaces of the Fabry-Perot interferometer. Said Fabry-Perot interferometer reflects a portion of the light into the optical circuit from each reflective surface of the interferometer creating a continuous interferometrically-modulated light signal. Said modulated light signal travels back through the circuit through said window and said lens, where the collimated beam is focused into the core of said optical fiber. Said modulated light signal is transmitted through said optical fiber to an interrogator where said modulated light signal is demodulated. Said interrogator demodulates said light signal and determines the length of the cavity or gap in the Fabry-Perot interferometer, i.e., the length of the space between the first and second partially reflective surfaces. Said cavity or gap has a length which is indicative of the mechanical deflection of said pressure sensing diaphragm assembly caused by the pressure being applied to said pressure sensing diaphragm assembly.

The hermetically-sealed connector assembly is comprised of two light delivery assemblies and an alignment socket assembly. Said light delivery assembly having an optical fiber with an optical axis, said optical fiber having an anti-reflective coating deposited on its end, a lens assembly having an optical axis and said lens assembly rigidly affixed to such optical fiber assembly positioning the lens a fixed distance from the end of the optical fiber to optimize the focus and transmission of a collimated beam of light, said lens having anti-reflective coatings on both surfaces of said lens. Said alignment socket assembly having two sockets and having a hermetically-sealed transparent window between said sockets, said hermetically-sealed transparent window having anti-reflective coatings deposited on both surfaces of said hermetically-sealed transparent window, said alignment socket assembly allows said light delivery assemblies to be aligned with one another through at least two degrees of freedom, and affixed to said alignment socket assembly.

The optical circuit for said hermetically-sealed connector assembly is comprised of a continuous stream of light rays that enter the first optical fiber from a broadband light source. Said light rays are transmitted through said first optical fiber to the end of said first optical fiber where a divergent beam of light radiates from said first optical fiber and is projected through the air space and onto a first lens. The continuous divergent beam of light travels through said lens and radiates from said lens as a collimated beam of light. Said continuous collimated light beam is projected through the air space and onto a window where the light is refracted along a new path through the window and is refracted again upon exiting the window. Said continuous collimated light beam is projected onto the second lens where said collimated beam is focused into the core of the second optical fiber and is transmitted along said second optical fiber.

SUMMARY DESCRIPTION OF THE DRAWINGS

The structure and operation of the present invention may be better understood by reference to the following summary description taken in connection with the following illustrations, wherein:

FIG. 1 shows a concept drawing of a rugged, stable, temperature-tolerant extrinsic Fabry-Perot absolute pressure transducer assembly 190 that is comprised of an extrinsic Fabry-Perot pressure sensor assembly 160, a hermetically-sealed connector assembly 170, and a metal transducer housing 180 which are affixed to one another.

FIG. 2 shows a concept drawing of said rugged, stable, temperature-tolerant extrinsic Fabry-Perot pressure sensor assembly 160. The primary function of said extrinsic Fabry-Perot pressure sensor assembly 160 is to make precise, high-speed pressure measurements under all specified shock and vibration conditions throughout the specified operating pressure and temperature range for the intended industrial application. Accordingly, said extrinsic Fabry-Perot pressure sensor assembly 160 is comprised of an optical fiber assembly 10, a lens assembly 20, an alignment socket 30, a window assembly 40, and a pressure diaphragm assembly 60. The space between said window assembly 40 and said pressure diaphragm assembly 60 comprise the cavity or gap of the Fabry-Perot interferometer 70. The components and subassemblies of said extrinsic Fabry-Perot pressure sensor assembly are joined by chemical bonding, brazing, and fusion welding. The metals, ceramics, transparent windows, and all joining materials are made of high strength materials with similar coefficients of thermal expansion.

FIG. 3 shows a concept drawing of said rugged, stable, temperature-tolerant hermetically-sealed connector assembly 170. This assembly is comprised of two light delivery assemblies 110 and an alignment socket assembly 130. The primary function of said hermetically-sealed connector assembly 170 is to make a hermetic seal that will allow an optical fiber on the sealed-side (sensor side) of the connector to communicate with a second optical fiber on the unsealed-side of the connector. Said hermetically-sealed connector must function under all specified shock and vibration conditions throughout the specified operating pressure and temperature range for the intended industrial application. Accordingly, the components and subassemblies of said hermetically-sealed connector assembly are joined by chemical bonding, brazing, and fusion welding. The metals, ceramics, transparent windows, and all joining materials are made of high strength materials with similar coefficients of thermal expansion.

FIG. 4 is concept drawing of an embodiment of the light delivery assembly of the present system.

FIG. 5 is a concept drawing of an embodiment of an optical fiber assembly of the present system.

FIG. 6 is a concept drawing of an embodiment of an optical figure/ferrule subassembly of the present system.

FIG. 7 is a concept drawing of an embodiment of a modified COTS ceramic ferrule of the present system.

FIG. 8 is a concept drawing of an embodiment of a clamshell lens assembly of the present system.

FIG. 9 is a concept drawing of an embodiment of a brazed lens assembly of the present system.

FIG. 10A is an exploded view of a Fabry-Perot sensor subassembly of the present system.

FIG. 10B is a concept drawing of a Fabry-Perot sensor subassembly of the present system.

FIG. 11 is a concept drawing of an alignment socket of the present system.

FIG. 12 is a concept drawing of a window assembly of the present system.

FIG. 13 is a concept drawing of a diaphragm assembly of the present system.

FIG. 14 is a concept drawing of a hermetically-sealed alignment socket window assembly of the present system.

DETAILED DESCRIPTION

While the present invention is described with reference to the embodiments described herein, it should be clear that the present invention should not be limited to such embodiments. Therefore, the description of the embodiments herein is illustrative of the present invention and should not limit the scope of the invention as claimed.

Reference will now be made in detail to embodiments of the present teachings, examples of which are illustrated in the accompanying drawings. It is to be understood that other embodiments may be utilized and structural and functional changes may be made without departing from the scope of the present teachings. Features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

The concept of said extrinsic Fabry-Perot absolute pressure transducer assembly 190 is shown in FIG. 1 and is comprised of an extrinsic Fabry-Perot pressure sensor assembly 160, a metal transducer housing 180, and a hermetically-sealed connector assembly 170.

The metal transducer housing 180 shown in FIG. 1 interfaces mechanically with said extrinsic Fabry-Perot pressure sensor assembly 160 shown in more detail in FIG. 2, said hermetically-sealed connector assembly 170 shown in more detail in FIG. 3, and with the engine or industrial process equipment used in the targeted industrial application.

Said extrinsic Fabry-Perot pressure sensor assembly 160, said hermetically-sealed connector assembly 170 are welded to said transducer body 180 while under vacuum or after being purged with dry nitrogen. The hermetically-sealed connector assembly 170 assures the atmosphere inside the transducer remains separate from the atmosphere outside the transducer. This hermetic seal is critical for aerospace applications and other industrial applications which require precise absolute pressure measurements or where a secondary pressure seal is required for safety.

The extrinsic Fabry-Perot pressure sensor assembly 160 shown in FIG. 1 is shown in more detail in FIG. 2 and is comprised of a light delivery assembly 110 and an extrinsic Fabry-Perot sensor subassembly 120.

It is necessary for all optical components in said extrinsic Fabry-Perot pressure sensor assembly 160 to be precisely aligned and for the collimated beam 150 in FIG. 2 to be perpendicular to the two partially reflective surfaces of the Fabry-Perot interferometer 70 to generate a high-quality optical signal. Since these ideal conditions cannot be met in practice without extreme manufacturing precision, an alignment socket 30 shown in FIG. 2 which is part of said Fabry-Perot sensor subassembly 120 is used to precisely align and optimize the signal quality and to ease the required manufacturing tolerances. Said alignment socket which is part of said Fabry-Perot sensor subassembly 120 provides three rotational degrees of freedom, i.e., pitch, yaw, and roll. Once aligned, said light delivery assembly 110 and said Fabry-Perot sensor subassembly 120 are joined creating said extrinsic Fabry-Perot sensor subassembly 160.

The conceptual design of said hermetically-sealed connector assembly 170 is shown in FIG. 3 and is comprised of two light delivery assemblies 110 and said hermetically-sealed alignment socket assembly 130.

It is necessary for all optical components in said hermetically-sealed connector assembly 170 to be precisely aligned as shown in FIG. 3 to facilitate highly efficient light transmission across the air space and through the window between the optical lenses in the two light delivery assemblies 110. Since these ideal conditions cannot be met in practice without extreme manufacturing precision, the hermetically-sealed alignment socket 130 shown in FIG. 3 is used to precisely align and optimize the light transmission and to ease the required manufacturing tolerances. Said hermetically-sealed alignment socket 130 provides three rotational degrees of freedom, i.e., pitch, yaw, and roll on each socket or six total rotational degrees of freedom for alignment. Once aligned, the two said light delivery assemblies 110 and said hermetically-sealed connector assembly 130 are joined creating said hermetically-sealed connector assembly 170.

The concept of said light delivery assembly 110 shown in FIG. 2 and shown in more detail in FIG. 4 is comprised of an optical fiber assembly 10 and a lens assembly 20. The primary purpose of the lens assembly 110 is to hold the lens in substantially the same location relative to the optical fiber under all specified shock and vibration conditions throughout the specified operating temperature range for the intended industrial application. Accordingly, before said optical fiber assembly 10 is joined to said lens assembly 20, the first surface 34 of the spherical metal housing 24 may be lapped a precise amount that will ensure the end face of the optical fiber assembly is positioned precisely at a distance equal to the back focal length of said lens 22 inside said lens assembly 20, i.e., illustrated in FIG. 4 as the standoff distance 22 from the end face of said optical fiber assembly 10 to the dashed line. This precise positioning established by the back focal length 22 is required to ensure a highly collimated beam 150 which maximizes the optical energy density that is delivered to the Fabry-Perot interferometer shown in FIG. 2.

The concept of said optical fiber assembly 10 shown in FIG. 4 and shown in more detail in FIGS. 5, 6, and 7 is comprised of an optical fiber/ferrule subassembly 19, metal housing 16, and sealing glass 18. Said optical fiber/ferrule subassembly 19 is described in more detail in FIG. 6. Said metal housing 16 is made of a high strength super alloy. Said sealing glass 18 is made as a preform using a high melting point temperature sealing glass. Said optical fiber/ferrule subassembly 19 is mechanically secured to said metal housing 16 by melting and freezing said sealing glass 18 preform. Said sealing glass 18 may be made as a preform using a high melting point temperature sealing glass materials that have closely matching coefficients of thermal expansion with said metal housing 16 and said COTS ceramic ferrule 32. Said sealing glass 17 must have a melting point well above the desired maximum operating temperature range of the sensor to be used in the intended harsh industrial application. When said sealing glass 18 preform melts around said optical fiber/ferrule subassembly 19, said sealing glass 18 fills the void created by cavity 13 and when cooled, said sealing glass freezes around said optical fiber/ferrule subassembly 19 achieving a high integrity mechanical bond with said optical fiber/ferrule subassembly 19 and achieving a high integrity chemical bond with said metal housing 16.

The end of said optical fiber assembly 10 may be lapped and polished to a high-quality optical finish on the end face of said metal jacketed optical fiber 11. This end face can be polished flat, i.e., 0°, or to any angle to reduce back reflection into the optical fiber.

After lapping and polishing the end face of optical fiber assembly 10, an anti-reflective (AR) optical coating 27 can be deposited on the end face of said optical fiber assembly 10 to reduce the light losses, back reflection into the optical fiber, and false Fabry-Perot signals.

The concept of optical fiber/ferrule assembly 19 is shown in FIG. 5 and is shown in more detail in FIG. 6. Said optical fiber/ferrule subassembly 19 is comprised of a metal-jacketed optical fiber 11, a modified commercial-off-the-shelf (COTS) ceramic ferrule 12, and a high temperature sealing glass preform 17. Said metal jacketed optical fiber 11 is mechanically secured to said modified COTS ceramic ferrule 12 using said sealing glass 17 preform. Said metal jacketed optical fiber is described below in paragraph 0029. Said modified commercial-off-the-shelf (COTS) ceramic ferrule 32 is shown in more detail in FIG. 7 and described below in paragraph 0028. Said metal housing 16 may be made of high strength super alloy materials with a coefficient of thermal expansion that closely match the coefficients of thermal expansion of said COTS ceramic ferrule 12. Said sealing glass 17 may be made as a preform using a high melting point temperature sealing glass materials that have closely matching coefficients of thermal expansion with said metal housing 16 and said COTS ceramic ferrule 32. Said sealing glass 17 must have a melting point well above the desired maximum operating temperature range of the sensor to be used in the intended harsh industrial application. When said sealing glass preform 17 melts around said metal-jacketed optical fiber 11, said sealing glass 17 fills any voids around said metal jacketed optical fiber 11 and when cooled, said sealing glass 17 freezes around said metal jacketed optical fiber 11 achieving a high integrity mechanical bond with said modified COTS ceramic ferrule 12.

The concept of modified COTS ceramic ferrule 12 is shown in FIG. 6 and shown in more detail in FIG. 7. Said COTS ceramic ferrule 32 may be made of zirconia or other suitable temperature-tolerant materials and may be almost any size or shape consistent with the intended industrial application. Said COTS ceramic ferrule 32 may be modified with four special features to aid in assembly and to secure the various components of the sensor assembly to one another. The first special feature of said COTS ceramic ferrule 32 may be a cavity 14 on the end of said COTS ceramic ferrule 32 sized to accept said sealing glass preform 17. The second special feature of said COTS ceramic ferrule 32 may be an oversized inside hole diameter 15 sized to accept said metal jacketed optical fiber 11, e.g., 190 um ID, and to allow positioning and alignment of said metal jacketed optical fiber 11 along the central axis of said modified COTS ceramic ferrule 12. A third special feature of said COTS ceramic ferrule 32 may be a cavity 33 located on the outside of said COTS ceramic ferrule 12. A fourth special feature of said COTS ceramic ferrule 32 may be the metallization of the outside circumference of said COTS ceramic ferrule 32 with a molybdenum/manganese (Mo/Mn) matrix 31 which shall serve as a bonding media for brazing said modified COTS ceramic ferrule 12 to said metal housing 16 eliminating the need for said cavity 33 and said sealing glass 18.

Said metal jacketed optical fiber 11 may be almost any multimode step index or graded index optical fiber with almost any multimode core/clad size with almost any numerical aperture and with almost any spectral characteristics but all these characteristics must be considered in the design of a sensor or transducer for any specific industrial application. To achieve long life at elevated temperatures above 500° F., the optical fiber should be jacketed with aluminum, gold, or other temperature-tolerant materials.

The concept of said lens assembly 20 is shown in FIG. 4 and is shown in more detail in FIGS. 8 and 9. The primary purpose of the clamshell lens assembly 20 is to hold the lens in substantially the same location relative to the optical fiber under all specified shock and vibration conditions throughout the specified operating temperature range for the intended industrial application. Accordingly, said clamshell lens assembly 20 may be comprised of a high compressive strength, temperature-tolerant lens 22 and one or more high-strength superalloy metal housings 24, 25, 26 to hold said lens 22.

FIG. 8 shows the concept of a clamshell-type lens assembly 20 where two spherical metal housings 24, 25 are welded together capturing said lens 22 in a clamshell manner without the use of any adhesives or other bonding materials. Said lens assembly 20 may be welded around the circumference of said spherical metal housings 24, 25. Said lens 22 held in place by such clamshell concept shall be subjected to uniformly high compressive loading along the axis of said lens 22 which high compressive loading is caused by weld shrinkage at the weld joint. The very small difference in the coefficient of thermal expansion between said spherical metal housings 24, 25 and said lens 22, the high compressive strength and high melting point of said lens 22, the high strength of the spherical metal housings 24, 25, the matching configuration of said ball lens spherical diameter and said spherical metal housing 24, 25 inside diameter, and the shrinkage welded metal during cooling place said lens assembly 20 into uniformly high compression but within the yield strength of said lens 22 and the yield strength of said spherical metal housings 24, 25. This high compressive force secures the position of the lens within the welded assembly throughout a −100° F. to 1200° F. temperature range however it does not create an absolute hermetic seal.

FIG. 9 shows the concept of a brazed lens assembly 21, a second embodiment of said lens assembly 20. The interface between said lens 22 and said spherical metal housing 26 on said lens 22 may be metallized with a molybdenum/manganese (Mo/Mn) matrix 28 which shall serve as a bonding media for brazing said lens 22 to said spherical metal housing 26 eliminating the need for a second spherical housing 25 and eliminating the need for welding. Brazing of said metallized lens 22 with said spherical metal housing 26 will create a hermetic seal between said lens 22 and said spherical metal housing 26 which hermetic seal shall be useful whenever an absolute pressure seal is required in the intended industrial application.

Said metal housings 24, 25, 26 are machined with spherical inside diameters and spherical outside diameters. The inside diameter of said metal housings 24, 25, 26 may be machined to precisely the same diameter as the external diameter of said lens 22. The outside diameter of said metal housings 24, 25, 26 may be machined to precisely the same internal spherical diameter as the alignment socket shown in FIG. 10B.

Said lens 22 may be configured as a ball lens, drum lens, grin lens, or other optical lens, and may be made of a high compressive strength, high melting point transparent material that has a coefficient of thermal expansion that closely matches that of said spherical metal housings 24, 25, 26.

An anti-reflective (AR) optical coating 23 may be deposited on said lens 22 through the apertures on both side of said lens assembly 20. Said AR optical coating 23 may be used to reduce light losses, back reflection into the optical fiber, and false Fabry-Perot signals created from adjacent optical elements.

The concept of said extrinsic Fabry-Perot sensor subassembly 120 is shown in FIG. 2 and is shown in more detail in FIGS. 10A and 10B. The four components of said extrinsic Fabry-Perot sensor subassembly 120 are the alignment socket 30, the window assembly 40, the shim 50, and the diaphragm assembly 60. These four components are aligned and joined to one another and will be addressed from left to right in the following paragraphs.

The concept of the alignment socket 30 is shown in FIGS. 10A and 10B and is shown in more detail in FIG. 11. The primary purpose of said alignment socket is to provide a reliable means of aligning the collimated beam emanating from said light delivery assembly perpendicular to the Fabry-Perot interferometer 70 and to maintain that precise alignment under all specified shock and vibration conditions throughout the specified operating temperature range for the intended industrial application. Accordingly, said alignment socket may be machined from a high-strength superalloy, ideally made of the same material as the mating parts of said alignment socket 30. The internal diameter of the socket is spherical and must have the same spherical internal diameter as the spherical external diameter on said spherical metal housings 24, 25, 26 shown in FIGS. 8 and 9. Although the spherical ball and socket concept shown in FIG. 2 has three rotational degrees of freedom (tilt, yaw, and roll), only two rotational degrees of freedom, i.e., tilt and yaw, are required using the ball and socket alignment arrangement 30 for the alignment of the light delivery assembly 110 with the Fabry-Perot sensor subassembly 120.

The concept of said window assembly 40 is shown in FIGS. 10A and 10B is shown in more detail in FIG. 12. Said window assembly 40 has two functions. The first function is to provide for the transmission of the collimated beam of light 150 from said lens assembly 20 to said pressure diaphragm assembly 60 as shown in FIG. 2. The second function is to provide an absolutely fixed reference first partially reflective surface for said Fabry-Perot interferometer 70 under all specified shock and vibration conditions throughout the specified operating temperature range for the intended industrial application. Accordingly, said window assembly is comprised of a metal ring 41 and a transparent window 42 bonded to one another.

Ideally, said metal ring 41 is made of the same high-strength superalloy material as the other metal parts of the sensor. Said metal ring 41 may have flanges for alignment and other features described below.

As shown in FIG. 12, said metal ring 41 may have a vent hole 43 to enable gas inside the transducer assembly shown in FIG. 1 to equalize throughout the inside of said transducer assembly and on both sides of the window assembly including inside the cavity of said Fabry-Perot interferometer 70. Alternatively, said transducer assembly 190 could be vented to atmosphere and said transducer assembly 190 could serve as a gauge pressure transducer instead.

Said transparent window 42 shown in FIG. 12 may be configured as a rod or disk and may be made of a temperature-tolerant transparent material that has a coefficient of thermal expansion that closely matches said metal ring 41 and has a melting point well-above the operating temperature for the intended industrial application.

Said transparent window 42 may be melted and bonded directly to said metal ring 41. Alternatively, the circumference of said window 42 may be metallized with a Mo/Mn matrix 44 and brazed to said metal ring 41.

Said window assembly 40 may be lapped and polished with two plane, parallel surfaces or alternatively the first surface of said window assembly 40 may be polished with a taper relative to the second surface. This alternative configuration would reject light that could be reflected into the optical fiber thereby increasing the noise floor of the modulated interferometric light signal.

An anti-reflective (AR) optical coating 46 may be deposited on the first surface of said window assembly 40 to reduce the light losses, back reflection into the optical fiber, and false Fabry-Perot signals.

A partially reflective dielectric optical coating 45 may be deposited on the second surface of said window assembly 40 which coating shall serve as the first plane, parallel, partially reflective surface of said Fabry-Perot interferometer 70 shown in FIG. 2.

The concept of said shim 50 is shown in FIG. 10A. The purpose of said shim is to establish the length of the cavity or gap in said Fabry-Perot sensor subassembly 70 shown in FIG. 10B and to assure the second surface of said window assembly 40 and the first surface of said diaphragm assembly 60 are parallel to one another. If these two critical partially reflective surfaces of said Fabry-Perot interferometer 70 are not parallel to with +/−0.25° of each other, the signal quality of the Fabry-Perot interferometer 70 will be severely compromised. Said shim has an outside diameter equal to said window assembly and said diaphragm assembly, an aperture equal to the internal diameter of the flange on said diaphragm assembly 60, and a thickness equal to the desired nominal length of the Fabry-Perot (interferometer) cavity 70. Alternatively, a nominal cavity or gap can also be established through sophisticated lapping and polishing procedures applied to said window assembly 40 and said diaphragm assembly 60.

In addition to being parallel, the two critical surfaces of said Fabry-Perot interferometer 70 must also be plane and have substantially equal reflectivity and low finesse. Being plane, means the surface must be flat without visible scratches, pits, or low frequency waves. Ideally, both partially reflective optical coatings should be balanced, i.e., the reflectivity should be equal one another at all wavelengths of interest for intended industrial application. Low finesse means the partially reflective optical coatings are in the range from about 4% to 50% reflective. If these conditions are met, the collimated beam of light will reflect multiple times between the two critical partially reflective surfaces and the resulting modulated light signals will be according to the Fabry-Perot Equation (1) where the intensity of the optical signal (I) is a function of the length of the Fabry-Perot (interferometer) cavity (d), and the wavelength of light (λ). F is a constant for any sensor and is defined by Equation (2). F is a function of the percent reflectivity R of the partially reflective optical coatings on the two critical Fabry-Perot interferometer surfaces, i.e., the second surface of said window assembly 40 and the first surface of said diaphragm assembly 60.

$$I(\lambda, d) = \frac{F \sin^2\left(\frac{2\pi d}{\lambda}\right)}{1 + F \sin^2\left(\frac{2\pi d}{\lambda}\right)} \tag{1}$$

$$i. \quad F = 4R/(1 - R)^2 \tag{2}$$

The concept of said diaphragm assembly 60 which is shown in FIGS. 10A and 10B and is shown in more detail in FIG. 13. A first function of said diaphragm assembly 60 is to provide communication with the process being measured. The second function of said diaphragm assembly 60 is to deflect linearly and repeatably under all specified shock and vibration conditions throughout the specified operating pressure and temperature range for the intended industrial application. A third function of said diaphragm assembly 60 is to provide a partially reflective surface 63 that is balanced with the partially reflective surface 45 shown in FIG. 12, these two partially reflective surfaces create said Fabry-Perot interferometer 70 shown in FIG. 10B. Accordingly, said diaphragm assembly 60 is comprised of a metal diaphragm 61 and a dielectric material 62, and a partially reflective dielectric optical coating 63.

Said diaphragm 61 is made from a high strength super alloy as the other metal parts of the sensor. Said diaphragm 61 is machined to a precise web thickness which is the primary determinate of the amount of deflection per unit of applied pressure. For example, a high strength, super alloy diaphragm that is 0.250 inches in diameter with a flange that is 0.210 inches in diameter and a mesa that is 0.050 inches in diameter with a web thickness of 0.020 inches, deflects about 10 nm per psi of applied pressure. Said diaphragm 61 is machined with an outer support flange 69 and an inner diaphragm mesa 62 which protrudes to approximately the same plane as the outer support flange 69.

Said dielectric material 62 may be any high melting point material that has a closely matching coefficient of thermal expansion with said diaphragm 61.

Said dielectric material 62 may be melted into a shallow cavity on the first surface of said diaphragm 61. Said dielectric material maybe lapped and polished plane and parallel with the outer support flange of said diaphragm assembly 60. After all lapping and polishing, the outer flange and inner mesa are flat and coplanar to within 5 um each other.

A partially reflective dielectric optical coating 63 may be deposited on the lapped and polished dielectric surface of said diaphragm assembly 60. Said dielectric coating 63 shall have the same partially reflective optical properties as said the dielectric coating 45 on window assembly 40.

Said partially reflective dielectric coatings 45 on said window assembly 40 and said partially reflective dielectric optical coating 63 on said diaphragm assembly 60 shall serve as the first and second plane, parallel, partially reflective surfaces of the Fabry-Perot interferometer 70.

Said diaphragm 61 can also be machined with an additional feature, i.e., a viewing port hole 65 as shown in FIG. 13 which is configured as a hole passing through the center of the mesa.

Said viewing port 65 can be bonded to said diaphragm 61 using the same methods as described above for creating said window assembly 40. Said viewing port window 65 may, for example, be used to detect UV energy which can determine the presence of a combustion flame. Said UV energy can be used to measure the intensity of such flame in a combustion turbine to determine instantaneously if a flame-out or near flame-out condition exists in the engine. Alternatively, the viewing port 65 can also be configured to measure temperature based on IR.

Said viewing port window 65 may use a UV or IR transparent window configured as a rod or disk and can be made of a temperature-tolerant transparent material that has a coefficient of thermal expansion that matches said diaphragm. Said viewing port window 65 can be melted and bonded in the port hole 64 in said metal diaphragm 61. Alternatively, said viewing port window 65 may be metallized with a Mo/Mn matrix and brazed into said UV viewing port hole 64 in said diaphragm 61.

Said UV viewing port window 65 must be hermetically sealed to said diaphragm 51 prevent process fluids from the process side of said diaphragm 61 from entering said Fabry-Perot interferometer.

Said UV viewing port window may be lapped and polished plane with first and second surfaces of said diaphragm assembly 60.

A partially reflective dielectric optical coating 63 may be deposited on the lapped and polished dielectric surface of said diaphragm assembly 60. Said dielectric coating 63 shall have the same partially reflective optical properties as said partially reflective dielectric coatings 45 on said window assembly 40.

Said partially reflective dielectric optical coating 63 on said diaphragm assembly 60 shall serve as the second plane, parallel, partially reflective surface of said Fabry-Perot interferometer 70.

An anti-reflective (AR) optical coating 66 can be deposited on the front surfaces of the viewing port window to reduce the light losses from the front/second side of said diaphragm assembly 60.

The external surfaces including the front side 68 of said diaphragm assembly 60 may also be coated with any material that will eliminate or reduce the corrosion rate of said front side 68 of diaphragm assembly 60. This optional radiant barrier coating 67 on the front side of said diaphragm assembly can also be used to reflect radiant energy away from said diaphragm to reduce the temperature of said Fabry-Perot sensor subassembly 120 as shown in FIG. 2 while in service.

The concept of said hermetically-sealed connector assembly 170 is shown in FIG. 3 is comprised of two light delivery assemblies 110 and an alignment socket assembly 130. Further details of said light delivery assembly 110 are shown in FIG. 4 and described beginning at paragraph 23 which is conceptually the same configuration as said light delivery assembly 110 used in the extrinsic Fabry-Perot pressure sensor assembly 160. The primary function of said light delivery assembly 110 within the said hermetically-sealed connector assembly is to communicate efficiently between two optical fibers across a fixed space instead of communicating between an optical fiber and an optical sensor. More specifically, the primary function of said light delivery assembly 110 is to convert a divergent beam of light emanating from one optical fiber into a collimated beam of light on one side of said hermetically sealed connector 170 and to capture such collimated beam of light and to focus it into the core of another optical fiber on the other side of said hermetically sealed connector 170 under all specified shock and vibration conditions throughout the specified operating temperature range for the intended industrial application.

The concept of said hermetically-sealed connector assembly 170 is shown in FIG. 3 is also comprised of a hermetically-sealed alignment socket window assembly 130. Further details of said alignment socket assembly 130 are shown in FIG. 14. The purpose of said hermetically-sealed alignment socket window assembly 130 is to facilitate the alignment of two said light delivery assemblies 110. A secondary purpose of said alignment socket assembly 130 is to create a hermetic seal between the two light delivery assemblies 110. The hermetically sealed alignment assembly must function under all specified shock and vibration conditions throughout the specified operating temperature range for the intended industrial application. Accordingly, said hermetically-sealed alignment socket window assembly 130 is comprised of two concentric alignment sockets 131 and an alignment socket window assembly 132 and affixed to one another.

Said alignment socket window assembly 132 is comprised of alignment socket window ring 133 and a transparent window 134 and is conceptually similar to said window assembly 40 shown in FIG. 12. Both window assemblies use the same transparent materials, the same material for the metal parts, the same bonding methods, and the same anti-reflection optical coatings. There are two exceptions. The first exception is said alignment socket window assembly 131 can not have a vent hole or that would defeat the purpose of the hermetically-sealed transparent window. The second exception is that both surfaces of said alignment socket window assembly 131 should have anti-reflection (AR) optical coatings deposited on both transparent window surfaces.

Ideally, said alignment socket 131 and said alignment socket window ring 133 are made of the same high-strength superalloy material as the metal ring 41 on said window assembly 40. Said alignment socket 131 said alignment socket window ring 133 may have flanges and other features for alignment.

Said transparent window 134 may be configured as a rod or disk and may be made of a temperature-tolerant transparent material that has a coefficient of thermal expansion that closely matches said alignment socket window ring 133 and has a melting point well-above the operating temperature for the intended industrial application.

Said transparent window 134 may be melted and bonded directly to said alignment socket window ring 133. Alternatively, the circumference of said transparent window 134 may be metallized with a Mo/Mn matrix 135 and brazed to said alignment socket window ring 133.

Said alignment socket window assembly 132 may be lapped and polished with two plane, parallel surfaces.

An anti-reflective (AR) optical coating 136 may be deposited on both surfaces of said alignment socket window assembly 132 to reduce the light losses, back reflection into the optical fiber, and false Fabry-Perot signals.

In another embodiment, the window 132 can be eliminated if an absolute seal is made by making a hermetic seal weld of the light delivery assembly to the alignment socket.

With careful selection of a variety of metal jacketed optical fibers, high strength metals for the machined parts, transparent window and lens materials, high-temperature sealing glass preforms, and high temperature braze materials; and with precision machining, laser welding, and electron beam welding, the resulting sensor/transducer assembly can provide rugged, reliable, stable, temperature-tolerant absolute static pressure measurements useful in many extremely harsh industrial applications.

While the present invention has been described with reference to the preferred embodiment, obviously other embodiments, modifications, and alternations could be ascertained by one skilled in the art upon reading the description of the present invention. The present invention is intended to cover these other embodiments, modifications, and alterations that fall within the scope of the invention upon a reading and understanding of this specification. For example, consider the following other embodiments:

Optical fibers with a wide variety of core/clad sizes, indices of refraction, numerical apertures ranging from 0.120 to 0.275 radians, transmission spectral characteristics, and a variety of temperature tolerant buffer coatings and/or jacketed materials can be used depending on the target application.

Machined parts can be made from a wide variety of raw materials and can be configured in any manner that will facilitate the assembly and optical alignment.

Lenses, ceramics, and transparent windows can be made from a variety of materials, shapes, and sizes that will result in a collimated beam that effectively and efficiency transmits and receives light to and from said sensor assembly 160.

A wide variety of assembly, alignment, and joining methods and materials including a wide variety of sealing glasses and brazing materials can be used to assemble, align, and fix the relative position of the various components of said transducer assembly 190.

A wide variety of dielectric optical coatings and optical coating stacks can be used for the deposition of partially reflective and anti-reflective optical coatings.

A wide variety of conductive and convective cooling, radiant barrier coatings, and radiant shields can be used to cool said sensor assembly.

The transducers can be configured to integrate additional sensors for the detection of light and for the measurement of temperature to augment the pressure measurements. Those additional sensors, e.g., UV and IR sensors, can use separate optical fibers for communication to the interrogator or can be time division multiplexed (TDM) or wavelength division multiplexed (WDM) to make multiple measurements on a single optical fiber.

Said transducer assembly 190 and said sensor assembly 160 can be reconfigured to make absolute static pressure, gauge pressure, differential pressure, dynamic pressure, or pseudo-static pressure measurements.

Said transducer assembly 190 and said sensor assembly 160 can be reconfigured with other sensing elements for measuring temperature, acceleration, position, or load which can be substituted for said pressure sensing diaphragm 60 to measure those other physical parameters.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

Having thus described the invention, we claim:

1. An optical sensor assembly comprising:
   an optical fiber having an optical axis;
   a lens in optical communication with said optical fiber, said lens comprising an optical axis and said lens is configured to transmit a collimated beam of light wherein said lens is fixed to one or more spherical lens housings having a spherical external diameter;
   a transparent window in optical communication with said lens, said transparent window capable of transmitting said collimated beam of light; and
   a Fabry-Perot interferometer in communication with said transparent window, wherein a second surface of said transparent window comprises a first partially reflective surface of said Fabry-Perot interferometer;
   a pressure sensing diaphragm wherein a first surface of said pressure sensing diaphragm comprises a second partially reflective surface of said Fabry-Perot interferometer which said second partially reflective surface is substantially parallel to said first partially reflective surface of said Fabry-Perot interferometer;
   an alignment socket having a spherical internal diameter same as the spherical external diameter which is configured to provide the lens at least two degrees of freedom adjustment relative to said Fabry-Perot interferometer to align said collimated beam of light emanating from said lens and said transparent window substantially perpendicular to said Fabry-Perot inter-ferometer, wherein said optical sensor assembly is rugged and temperature-tolerant capable of being used to measure absolute static pressure in harsh industrial applications.

2. The sensor assembly of claim 1, wherein said lens comprises at least one of: a ball lens; a drum lens; a graded index lens; a lens that focuses light; and a lens that colli-mates light.

3. The sensor assembly of claim 1, further comprising a ceramic ferrule, wherein the ceramic ferrule has special features to capture and to secure a metal-jacketed optical fiber in said ceramic ferrule.

4. The sensor assembly of claim 1, further comprising an optical fiber/ferrule subassembly, wherein the optical fiber/ferrule subassembly has at least one of a cavity, a hole diameter, and a metallized outside circumference to capture and secure said optical fiber/ferrule subassembly in position relative to a metal housing.

5. The sensor assembly of claim 1, wherein an end face of an optical fiber assembly is lapped and polished flat at a 90° angle to an axis of a metal-jacketed optical fiber to reduce back reflection into the metal-jacketed optical fiber.

6. The sensor assembly of claim 1, further comprising an optical fiber assembly encasing a metal-jacketed optical fiber aligning said optical axis of said metal-jacketed optical fiber with said optical axis of said lens.

7. The sensor assembly of claim 1, further comprising an optical fiber assembly encased in a metal-jacketed optical fiber aligning said optical axis of said metal-jacketed optical fiber off axis with said of said optical axis of said lens.

8. The sensor assembly of claim 1, wherein said lens is not attached to a metal-jacketed optical fiber and where a spacing between said lens and said metal-jacketed optical fiber is fixed substantially at an ideal back focal length between said metal-jacketed optical fiber and said lens.

9. The sensor assembly of claim 1, wherein a first surface of a window assembly is parallel to the second surface of said window assembly.

10. The sensor assembly of claim 1, wherein a first surface of a window assembly is not parallel to the second surface of said window assembly.

11. The sensor assembly of claim 1, wherein said dia-phragm comprises at least one of:

a flat diaphragm or a mesa diaphragm said mesa dia-phragm comprising a circular groove substantially sur-rounding said mesa with a protrusion in the center and a flange around an outer edge of the diaphragm.

12. The sensor assembly of claim 1, wherein said pressure sensing diaphragm has a viewing port window that pen-etrates through the diaphragm.

13. The sensor assembly of claim 1, wherein said second surface of a window assembly and said first surface of said pressure sensing diaphragm assembly have no reflective optical coatings, single layer partially reflective dielectric optical coatings, or a multilayer stack of partially reflective dielectric optical coatings that are substantially identical on both surfaces.

14. The sensor assembly of claim 1, wherein any combi-nation or all of an optical fiber assembly, a lens assembly, and a first surface of a window assembly 40, and said second surface of a pressure diaphragm assembly have any of the following: no reflective optical anti-reflective coating, a single layer dielectric anti-reflective optical coating, or a multilayer stack anti-reflective dielectric optical coating.

15. The sensor assembly of claim 1, wherein a Fabry-Perot interferometer cavity length is formed by a circular shim of any thickness with an internal aperture substantially larger than a diameter of the collimated beam which shall serve to separate the first partially reflective surface on the second surface of a window assembly from the second partially reflective surface on the first surface of a pressure diaphragm assembly while keeping the two surfaces sub-stantially parallel to one another.

16. The sensor assembly of claim 1, wherein said lens is configured to be rotated in two angular degrees of freedom relative to said Fabry-Perot interferometer to align said collimated beam of light transmitted from said lens substan-tially perpendicular to said Fabry-Perot interferometer.

17. The sensor assembly of claim 1, wherein said lens is configured to be positioned longitudinally relative to the said first surface of a window assembly.

18. The sensor assembly of claim 1, further comprising a radiation protective coating on the said second surface of said pressure sensing diaphragm to reflect radiation energy and to protect said pressure sensing diaphragm.

19. The sensor assembly of claim 1, further comprising a transducer housing joined to said sensor assembly.

20. The sensor assembly of claim 19, further comprising a radiation shield to cool and protect said pressure sensing diaphragm from physical or thermal damage.

21. The sensor assembly of claim 19, incorporating fea-tures to facilitate conductive and/or convective cooing of said sensor assembly.

22. The sensor assembly of claim 19, incorporating a flexible extension to position the sensor assembly physically closer to an industrial process to be measured.

23. The sensor assembly of claim 19, further comprising a connector or flexible cable and connector to facilitate connection to an optical interrogator.

24. The sensor assembly of claim 23, where the connector is an absolute connector using a lens to transmit light to a mating connector.

25. The sensor assembly of claim 19, wherein a transducer is configured to make derivatives of absolute static pressure measurements including: gauge pressure, differential pres-sure, dynamic pressure, or pseudo-static pressure measure-ments.

26. The sensor assembly of claim 19, wherein a transducer is configured to make other measurements including: tem-perature, acceleration, position, load, level, or density mea-surements.

27. The sensor assembly of claim 19, wherein a transducer is configured integrate additional sensors for the measure-ment of temperature, ultraviolet (UV), visible or infrared (IR) light.

28. The sensor assembly of claim 27, further comprising additional sensors configured to be supported via separate optical fiber or via time or wavelength division multiplexing (TDM or WDM).

29. An optical sensor assembly comprising:

an optical fiber having an optical axis;

a lens in optical communication with said optical fiber, said lens comprising an optical axis and said lens is configured to transmit a collimated beam of light;

a transparent window in optical communication with said lens, said transparent window capable of transmitting said collimated beam of light; and a Fabry-Perot interferometer in communication with said transparent window, wherein a second surface of said transparent window comprises a first partially reflective surface of said Fabry-Perot interferometer;

a pressure sensing diaphragm wherein a first surface of said pressure sensing diaphragm comprises a second partially reflective surface of said Fabry-Perot interferometer which said second partially reflective surface is substantially parallel to said first partially reflective surface of said Fabry-Perot interferometer;

an alignment socket which is configured to provide the lens at least two degrees of freedom adjustment relative to said Fabry-Perot interferometer to align said collimated beam of light emanating from said lens and said transparent window substantially perpendicular to said Fabry-Perot interferometer, wherein said optical sensor assembly is rugged and temperature-tolerant capable of being used to measure absolute static pressure in harsh industrial applications; and wherein a Fabry-Perot interferometer cavity length is formed by a circular shim of any thickness with an internal aperture substantially larger than a diameter of the collimated beam which shall serve to separate the first partially reflective surface on the second surface of a window assembly from the second partially reflective surface on the first surface of said pressure diaphragm assembly while keeping the two surfaces substantially parallel to one another.

* * * * *